April 28, 1964  M. D. HEYMAN  3,131,114
GLASS-INCLUDED INTEGRATED MICA SHEET AND METHOD OF PRODUCTION
Filed Dec. 21, 1959
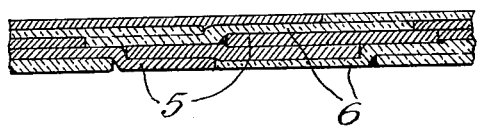
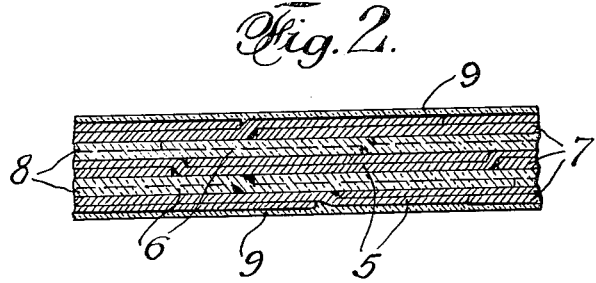
INVENTOR.
MOSES D. HEYMAN
BY
ATTORNEY United States Patent Office 3,131,114
Patented Apr. 28, 1964

3,131,114
GLASS-INCLUDED INTEGRATED MICA SHEET
AND METHOD OF PRODUCTION
Moses D. Heyman, Woodmere, N.Y., assignor, by mesne assignments, to Acim Paper Corporation, Woodmere, N.Y., a corporation of New York
Filed Dec. 21, 1959, Ser. No. 860,979
5 Claims. (Cl. 161—171)

This invention relates to a sheet of integrated mica in which glass is embodied and to a method for producing the same.

An object of the present invention is to provide a sheet, containing both mica and glass, that is strongly integrated, hard but flexible, totally non-flammable, and only slightly porous, or even non-porous.

The invention, therefore, provides a sheet that is stable for a variety of uses, particularly where porosity and where evaporation or "burning out" of impregnants are not desired properties. In evacuated environments, the gases given off by impregnants of integrated mica sheets would destroy the vacuum. It is contemplated that the present mica-glass sheet, because of the non-volatility of its components, will not gasify.

Another object of the invention is to provide a mica-glass sheet in which both the mica and the glass that are used are in flake form and so thin that both are flexible when prepared for incorporation into the integrated sheet, but which when pressed and/or fused together, form a stable sheet having the properties above mentioned.

A further object of the invention is to provide a novel and improved method for producing a sheet that is integrated from mica and glass flakes. Such a sheet may have outer surfaces of thin glass so as to protect it from wear and moisture, such surfaces being thin enough not to destroy flexibility of the sheet.

Materials that contain mica and glass have been produced previously. One such material comprises ground mica and ground glass and is much used for insulation purposes. Because of the comminuted form of the ingredients, this material molds efficiently. However, the same is brittle and is not recommended for sheets that are quite thin (less than $\frac{1}{16}$ inch) because of such fragility. Moreover, this material is difficult to machine and is so abrasive to machining tools as to cause them to wear rapidly. Since the glass particles of this known material fuse together in a solid, although cellular, glass mass, the aforementioned brittleness and tool abrasion result.

It is a still further object of the invention to provide a sheet comprised only of mica and glass which not only has all the desirable properties of these materials, but also has such materially reduced brittleness and tool-wearing properties, that the same may be made in sheets substantially thinner than $\frac{1}{16}$ inch and machines well without abnormal tool wear. The foregoing results from the provision of a sheet in which, rather than using comminuted or powdered mica and glass, flakes of these materials are employed, of such thin degree—in the order of five microns and less—that the same retain softness and pliability even after having been subjected to melting or fusion temperatures. By interspersing glass flakes with mica flakes, or arranging the glass flakes and mica flakes in alternate layers, fusion of glass flakes into a mass is largely prevented, and the mica-glass sheet here contemplated retains the desired properties above set forth.

The foregoing and other objects, features and advantages of the present invention will become more clearly evident as the following description of preferred forms of sheets and of methods for producing the same progresses. Reference is made to the accompanying drawing in which such features are illustrated.

In the drawing:

FIG. 1 is an enlarged and fragmentary, and greatly enlarged, cross-sectional view of one form of sheet according to the present invention.

FIG. 2 is a similar view of another form of sheet.

In FIG. 1 it is shown that mica flakes 5 are interspersed with glass flakes 6; that both types of flakes are quite thin as compared to their length and width; that their thickness varies, but in a close range; and that fusion of the flakes 5 and 6 so integrates the sheet that the same resists flaking and has a hardness and limited flexibility comparable to plastic and ceramic type materials. In fact, such a mica-glass sheet has attributes somewhat analogous to sheet metal, in that the same has a metallic ring when struck, machines with ordinary tools, and does not gasify under reasonably high temperatures and/or vacuum.

FIG. 2 differs in structure from the sheet of FIG. 1 in that instead of a general intermingling of the mica and glass flakes, the same are arranged in alternate layers. The layers 7 of mica each comprise flakes 5, and the layers 8 of glass each comprise flakes 6. The demarcation between layers need not necessarily be a definite one, but as shown, mica flakes 5 may encroach on glass layers 8, and glass flakes 6 on mica layers 7.

While any type of mica may be used to provide the flakes 5, phlogopite mica is deemed to be best where high temperature usage is contemplated. This type of mica has good flexibility and is softer than muscovite mica. Where temperatures above 1700° F. may be encountered in use, synthetic mica—an artificially made fluoro-phlogopite mica—could be advantageously used. Such mica can withstand 2100° F. Also, combinations of natural and synthetic phlogopite mica may be used. In the manufacture of electric capacitors, a high dielectric constant and low power factor are necessary. Muscovite mica is best for such a purpose because it possesses these qualities.

In cases where a minimum amount of gassing is essential, natural phlogopite mica is preferred because the same has less waters of crystallization (about two-thirds as much) as muscovite mica. Synthetic fluoro-phlogopite mica is best because it contains no waters of crystallization.

Inasmuch as this mica is expensive, it can be mixed in varying proportions with natural phlogopite so as to obtain a material that has high temperature resistance with low gassing effects.

The particular type of mica used for flakes 5 will generally control the type of glass used for flakes 6. In a general way, it may be stated that phlogopite and fluoro-phlogopite mica flakes 5 would be used with glass flakes 6 that have a melting point of 1100° F. or above, and muscovite mica flakes would be used with glass flakes that have a melting point of 1100° F. or less.

A typical form of glass which melts at about 1550° F.

is commonly known as type "E" glass. It has the following formula:

|  | Percent |
|---|---|
| Silica | 54 |
| Lime | 16 |
| Aluminum | 16 |
| Boron oxide | 10 |
| Soda and potash | 4 |

One example of a low melting point glass is lead borate glass that may be sintered or melted at temperatures as low as 800° F.

The mica flakes are of the type that have nascent or activated surfaces, the same being disclosed in my Patents No. 2,405,576, dated August 13, 1946; No. 2,659,412, dated November 17, 1953; and No. 2,703,598, dated March 8, 1955. Said patents disclose that mica flakes used in integrated sheets are extremely thin, in the nature of but a few microns in thickness. Four microns is mentioned as exemplary; thinner flakes will occur and are desirable; and slightly thicker flakes—five or six microns—may be used if in small proportion to the thinner flakes. Patent No. 2,405,576, dated August 13, 1946, discloses that the flakes that comprise integrated mica are thin, have activated surfaces, and act on each other to cohere one to the other. It is such flakes that are used in the present sheet.

The mica flakes comprise splittings of mica pieces that have been cleaned to rid the same of impurities and foreign particles and also of moisture. Such splittings are obtained while immersed in a liquid medium so that activation of the surfaces of the flakes is retained. Reference is made to the patents mentioned above.

The glass flakes 6 are preferably of size and thickness similar to the mica flakes. The same may be made in several ways to preferably have nascent or activated surfaces as do the mica flakes. It will be understood that the mica flakes are quite flexible naturally. The glass flakes are flexible by reason of their extreme thinness, as explained below. Such glass flakes may advantageously be about one-half inch square and somewhat smaller. Whether or not all of the glass flakes used in a sheet are activated, the same have good coherence to nascent mica flakes and are effective to integrate with such flakes into a mica-glass integrated sheet.

One way of making the glass flakes 6 is to extrude molten glass in the form of a sheet of about four microns in thickness. Such a thin extrusion will fracture naturally and is received in flake form in a liquid medium, such as distilled or de-ionized water; or said flakes may be dropped or directed into a device where the same are intermingled with mica flakes. Patent No. 2,659,412, above mentioned, comprises apparatus that may be used for this purpose. Thus, as mica flakes are being formed as splittings or mica pieces, glass flakes are added in desired proportion so that there is a thorough commingling of all of the flakes. The glass flakes may be fed directly as they fracture, or the same may first be fractured and then fed to the commingling apparatus. Alternatively, the glass flakes may be gathered from their liquid bath, compressed into a block form, and stored until the same are to be incorporated into a mica-glass sheet. In such case, the glass flakes retain their activity and good cohering properties.

Since the apparatus in Patent No. 2,659,412 constitutes an exemplary means for forming an integrated sheet of mica and glass flakes in substantially the same way that said apparatus forms a mica sheet, no additional description need here be given as to the integration features of the sheet.

The sheet shown in FIG. 1 will be the result of such integration. As to the proportion of mica to glass, up to 60% of glass flakes have been incorporated into an integrated sheet. However, from a practical view, such high proportion of glass may be reduced to 40% glass to mica and even as low as 10%. Good results have been obtained using 30% glass to mica.

In the production of the present mica-glass sheet, it has been found to be advantageous to heat the sheet while the same is under pressure, the heat approximating the melting point of the glass and preferably somewhat higher. Since the melting point of the glass is above 1550° F., the sheet is heated to, say, 1650° F. while under a pressure of 100 to 500 p.s.i. By using this method, as little as 20% of glass, under a pressure of 500 p.s.i., will give results equally as good as sheets having, say, 40% of glass under a lower pressure of, say, 100 p.s.i. Time of heat and pressure would be varied according to sheet thickness—one minute, or thereabouts, for very thin sheets, and as much as one-half hour for the thicker sheets.

Thick sheets may be made by laminating a plurality of thin sheets and applying heat and pressure to fuse the mass.

By cooling slowly, an annealing effect is obtained, the same contributing to flexibility of the finished sheet. By leaving the mica sheets in the pressure means under pressure in the oven after the heat has been shut off for about four hours, or allowing the temperature to drop to about 350° F., the sheets are annealed and less brittle.

The layered sheet of FIG. 2 may be produced by apparatus such as disclosed in Patent No. 2,703,598. By providing such an apparatus with several inlets for glass flakes and alternately spaced inlets for mica flakes, the moving web thereof will collect thereon a plurality of mica and glass layers as depicted in FIG. 2. The sheet thus integrated may be heated and pressed as above described to fuse the flakes together.

As can be seen in FIG. 2, a thin glass coating 9 may be applied to one or both sides of the integrated mica-glass sheet. Both sides are preferred to obviate flaking, moisture absorption, and to increase resistance to abrasion. Such coatings 9 may be applied by addition of glass flakes that may fuse together under oven heat, as above described.

The integration into a sheet is accomplished in the presence of a liquid carrier for the flakes, as can be seen from the mentioned patents, and the flakes are retained in activated condition thereby.

Since the above description is exemplary, the articles and methods described may be varied or modified without departing from the spirit and scope of the invention as defined in the appended claims. It should be clear, however, that both the mica and glass of the present sheet comprise flakes of great areal size in proportion to their thickness, not powder-like particles that have relatively small areal size in relation to their thickness. While mica flakes approximately ¼" across may be advantageously used, smaller flakes, as small as 1/16" across, may be used with good results. Even such smaller flakes are much greater in area than the mentioned exemplary thickness of four to six microns. In practice, those flakes that would pass through a ¼" mesh screen, even if some of them are quite small, would provide flakes of a size suitable to produce the present sheet. Most of these flakes would be at least one hundred times larger in area than their thickness or particles of powder-like size.

I claim:

1. An integrated sheet of mica flakes having nascent surfaces that induce cohesion among the flakes and glass flakes in which the mica and glass flakes are interspersed throughout the thickness of the sheet and there is fusion among the glass flakes and adhesion between the mica and glass flakes, the flakes having a general thickness in the order of four microns, and the proportion of glass flakes to mica flakes being approximately 30% to 60% glass flakes and the remainder mica flakes.

2. An integrated sheet of mica flakes having nascent surfaces that induce cohesion among the flakes and glass flakes comprising approximately 10% to 40% of glass flakes and the remainder mica flakes, said flakes being interspersed throughout the sheet.

3. The method of producing a mica-glass integrated sheet that consists in commingling only glass and mica flakes having nascent surfaces that induce cohesion among the flakes in the proportion of 10% to 40% glass flakes and 90% to 60% mica flakes, depositing said glass and mica flakes in a layer in sheet form in the presence of a liquid carrier, applying a temperature as high as the melting point of the glass flakes, and subjecting the sheet to a pressure between 100 and 500 p.s.i.

4. The method according to claim 3 in which the heat is applied at a temperature between 800° F. and 1650° F.

5. The method according to claim 4 in which the heat and pressure are applied for a period between one and five minutes.

References Cited in the file of this patent

UNITED STATES PATENTS

| | | |
|---|---|---|
| 1,795,200 | Crossley | Mar. 3, 1931 |
| 2,391,376 | Monack | Dec. 18, 1945 |
| 2,704,105 | Robinson et al. | Mar. 15, 1955 |
| 2,859,794 | Barr | Nov. 11, 1958 |
| 2,897,573 | Hessinger | Aug. 4, 1959 |

FOREIGN PATENTS

| | | |
|---|---|---|
| 553,104 | Great Britain | May 7, 1943 |